US009672976B2

(12) United States Patent
Levo et al.

(10) Patent No.: US 9,672,976 B2
(45) Date of Patent: Jun. 6, 2017

(54) MULTI-MODE WIRELESS CHARGING

(71) Applicant: Nokia Corporation, Espoo (FI)

(72) Inventors: Sakari Johannes Levo, Turku (FI); Jari Juhani Muurinen, Perniö (FI)

(73) Assignee: Nokia Corporation, Espoo (FI)

( * ) Notice: Subject to any disclaimer, the term of this patent is extended or adjusted under 35 U.S.C. 154(b) by 714 days.

(21) Appl. No.: 14/065,095

(22) Filed: Oct. 28, 2013

(65) Prior Publication Data

US 2015/0115723 A1 Apr. 30, 2015

(51) Int. Cl.

| | |
|---|---|
| ***H01F 38/14*** | (2006.01) |
| ***H01F 41/00*** | (2006.01) |
| ***H02J 7/02*** | (2016.01) |
| ***H01F 27/36*** | (2006.01) |
| *H01F 3/10* | (2006.01) |

(52) U.S. Cl.

CPC ........... *H01F 38/14* (2013.01); *H01F 27/365* (2013.01); *H01F 2003/106* (2013.01); *Y10T 29/49073* (2015.01)

(58) Field of Classification Search

None

See application file for complete search history.

(56) References Cited

U.S. PATENT DOCUMENTS

| | | | | |
|---|---|---|---|---|
| 2008/0122047 A1* | 5/2008 | Honer | H01L 23/552 | 257/660 |
| 2013/0249312 A1* | 9/2013 | Uchida | H01F 27/365 | 307/104 |
| 2015/0230312 A1* | 8/2015 | Akiya | H02J 5/005 | 315/70 |

FOREIGN PATENT DOCUMENTS

| | | |
|---|---|---|
| CN | 102598465 A | 7/2012 |
| CN | 102647030 A | 8/2012 |
| CN | 103109333 A | 5/2013 |
| CN | 103229194 A | 7/2013 |
| CN | 103250325 A | 8/2013 |
| WO | 2013/032205 A2 | 3/2013 |
| WO | 2013/032250 A1 | 3/2013 |

OTHER PUBLICATIONS

U.S. Appl. No. 13/726779, "Multi-Layered Magnetic Shields", filed Dec. 26, 2012, 44 pages.

Apr. 1, 2016—(CN) First Office Action and Search Report—App 201410584931.0—Eng Trans.

* cited by examiner

*Primary Examiner* — Jared Fureman

*Assistant Examiner* — Aqeel Bukhari

(74) *Attorney, Agent, or Firm* — Banner & Witcoff, Ltd.

(57) ABSTRACT

A device may include a multiple inductive coils arranged concentrically for operating according multiple modes of wireless power transfer. The device may include multiple layers of magnetic shields to protect device components from the effects of the magnetic field used for power transfer. Construction and material of multiple layers of shields may be based on addressing individually the different parameters of the multiple modes of operation and based on the combined effect of the layers in each mode of operation. In some examples, the device may include first and second ferrite shields each having different magnetic properties.

20 Claims, 7 Drawing Sheets

MULTI-MODE WIRELESS CHARGING

BACKGROUND

Inductive wireless power transfer (IWPT) enables short range wireless power transfer from a power source to a load through inductive coupling. One application of inductive wireless power transfer is in the powering and charging portable consumer electronic devices, such as cell phones, smart phones, tablets, and laptop computers. In such an application, a portable device including an inductive coil is placed on a base station that also includes an inductive coil. The power source drives the inductive coil in the base station causing a transfer of electromagnetic energy from the power source inductive coil to the portable device inductive coil. The transferred energy is then used to power the portable device, e.g., to charge the batteries of portable device. Two IWPT techniques that are employed today in commercial products include tightly coupled inductive charging and loosely coupled charging.

A tightly coupled charging system works similar to a transformer and relies on a strong magnetic linkage, i.e., mutual inductance, between the source and load coils. To achieve the strong magnetic linkage, the load inductive coil may be placed in close proximity and in alignment with the power source inductive coil. Commercial examples of tightly couple charging systems include the Qi standard developed by the Wireless Power Consortium, and the Powermat™ standard adopted by the Power Matters Alliance (PMA).

In a loosely coupled charging system, efficient energy transfer is achieved through magnetic resonance of the load and source inductive coils rather than through strong magnetic linkage. Because loosely coupled charging systems do not rely on strong magnetic linkage between the coils, proximity and alignment of the coils is not as critical. A commercial example of a loosely coupled (or resonant) charging system is put forth in the Alliance for Wireless Power (A4WP) standard.

The different techniques (e.g., tight or loose coupling) may benefit from different design parameters to work efficiently. Such parameters that differ between the different techniques may include coil size, operating frequency, distance between coils, coil alignment, ferrite materials, shielding materials, etc. As such, a mobile device or appliance designed for one IWPT system may not work with a power source designed for a different IWPT system.

SUMMARY

This Summary is provided to introduce a selection of concepts in a simplified form that are further described below in the Detailed Description. This Summary is not intended to identify key or essential features of the invention.

Embodiments include, without limitation, an assembly including multiple inductive coils arranged concentrically for operating according multiple modes of inductive wireless power transfer. The assembly may include multiple layers of magnetic shields to protect device components from the effects of the magnetic field used for power transfer. Construction and materials of multiple layers of shields may be based on addressing individually the different operating parameters of the multiple modes of power transfer and/or based on the combined effect of the layers in each mode. One of the inductive coils may be tuned to operate in a tightly coupled inductive wireless power transfer configuration operating at a lower frequency and another one of the inductive coils may be tuned to operate at a higher frequency in a loosely coupled (or resonate) inductive wireless power transfer configuration. The tightly coupled coil may operate according to multiple different standards, and the loosely coupled coil may also operate according to multiple different standards.

Additional embodiments are disclosed herein.

BRIEF DESCRIPTION OF THE DRAWINGS

Some embodiments are illustrated by way of example, and not by way of limitation, in the FIGS. of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Figure 1:
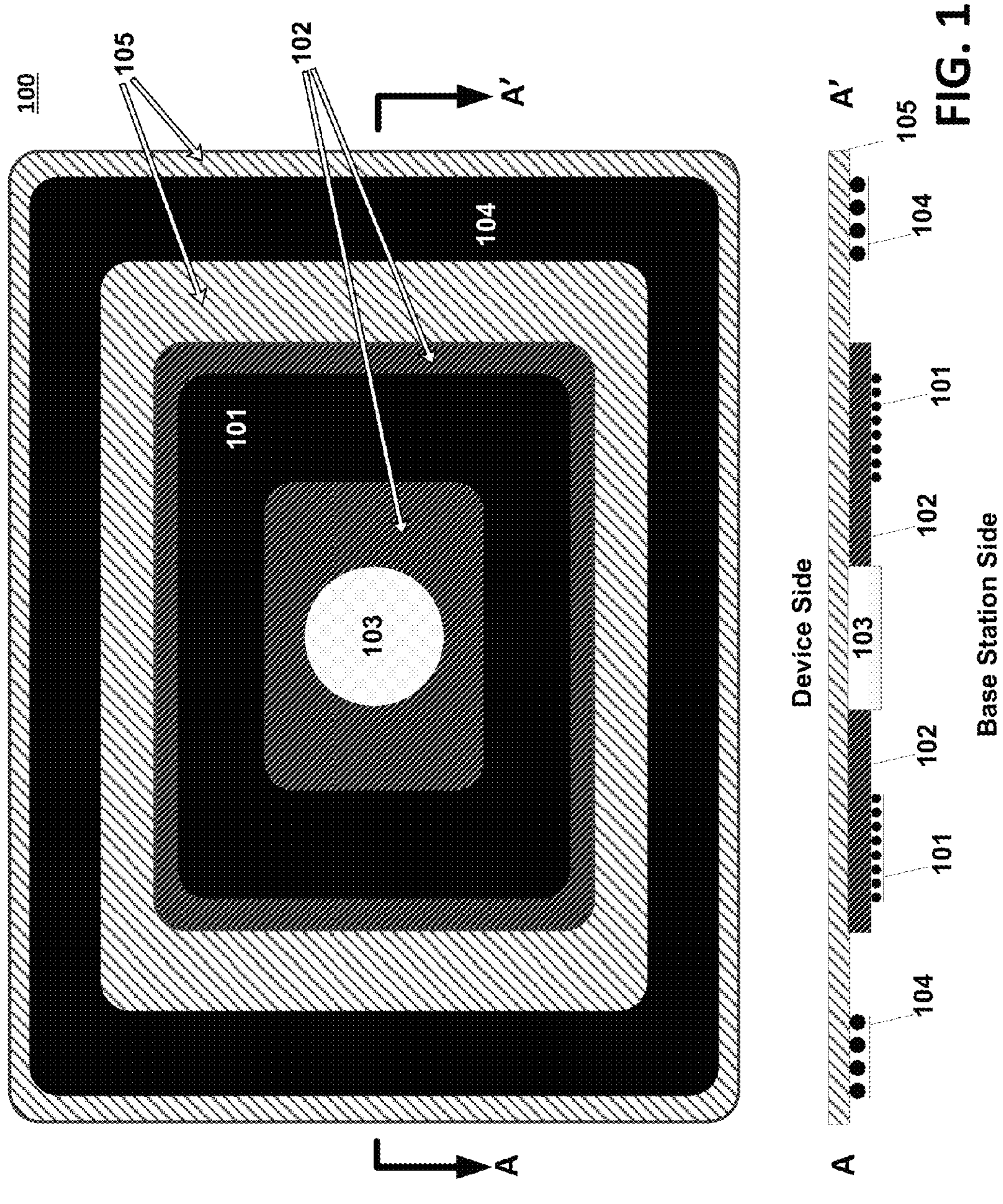
FIG. 1 illustrates multiple views of an inductive wireless power transfer assembly according to various embodiments.

FIG. 1 includes an illustrative example of a multi-coil assembly 100 for use in a portable device or charging base station to enable multiple modes of inductive wireless power transfer. FIG. 1 illustrates two views of the assembly, a top view and a cross-sectional view A-A'. As shown in the top view, assembly 100 includes inductive coils 101 and 104 arranged concentrically. Within the center of coil 101 a magnet 103 may be located. As shown in cross-sectional view A-A', coils 101 and 104 are oriented such that they may receive electrical power via electromagnetic flux from the base station side.

Assembly 100 may include multiple layers of magnetic shields, such as shields 102 and 105. As shown in view A-A', magnetic shields 102 and 105 are oriented between a device side of the assembly and inductive coils 101 and 104. In this example magnetic shield 105 extends the full area of the assembly 100 providing shielding of electromagnetic flux that reach coils 101 and 104 from reaching the device side, where for example, electrical components of the portable device may be located.

Shields 102 and 105 may be comprised of one or more ferrite materials. As used herein, "ferrite" refers generally to materials including at least one ferro-magnetic material (e.g., cobalt, nickel, iron, gadolinium, etc.) combined with one or more other materials. Shields made with ferrite materials have a permeability, structure, and shape that provide a reluctance path for magnetic fields that is lower than the reluctance path through the components that are intended to be shielded. Examples of such materials may include nickel-iron (NiFe) alloys, silicon-iron (SiFe) alloys, cobalt-iron (CoFe) alloys, and other such materials. Various embodiments may include, a composition of $Fe_{73}Cu_1Nb_3Si_16B_7$. Although various embodiments are described using ferrite shields as an example of magnetic shielding, also other types of magnetic shields are within the scope of the disclosure. Shields 102 and 105 may for example comprise polymer materials, such as a combination of those materials listed above (or other magnetic materials) combined with a polymeric binder."

As used herein, "permeability" and "magnetic permeability" refer to relative magnetic permeability, which is equal to the ratio of absolute magnetic permeability of a material ($\mu_a$) to the magnetic permeability of free space ($\mu_o$). Because relative permeability is a ratio ($\mu_a/\mu_o$), the value is unitless.

In some configurations, each coil may be used for a different power transfer technique or standard. In other configurations, a coil may be configured to operate according to multiple techniques. For example, according to one embodiment, coil 101 may be used in a tightly coupled configuration to support multiple standards, such as the Qi standard and the PMA standard, while coil 104 may be used in a loosely coupled configuration to support one or more standards, such as the A4WP standard.

The geometry and materials of assembly 100 may be selected based on the different power transfer techniques or standards (e.g., tightly coupled, loosely coupled) to be used with each coil 101 and coil 104. In some embodiments, for example, the material and geometry of shield 102 may be selected according to operating parameters of coil 101 operating in accordance with a first and/or a second IWPT standard (e.g., Qi and/or PMA), and the material and geometry of shield 105 may be selected according to operating parameters of coil 104 operating in accordance with a third IWPT standard (e.g., A4WP). In other embodiments, the materials and geometries of each of shields 102 and 105 may be selected according to the operating parameters for both coils 101 and 104 for different IWPT techniques. For example, shields 102 and 105 may be designed to provide a specific combined effect for shielding coil 101 operating in one or more modes, while the design of shield 105 further provides a specific effect for shielding coil 104 operating in one or more additional other modes.

Figure 2A:
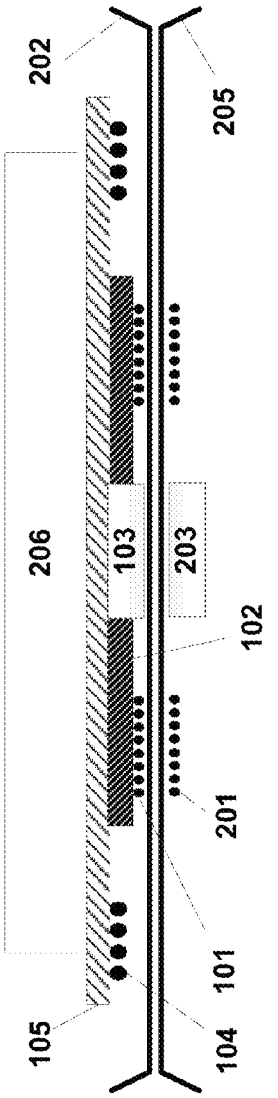
FIGS. 2A-B illustrate cross sectional views of example arrangements of a receiving coil assembly relative to a transmitting coil operated in multiple different modes according to various embodiments.
Figure 2B:
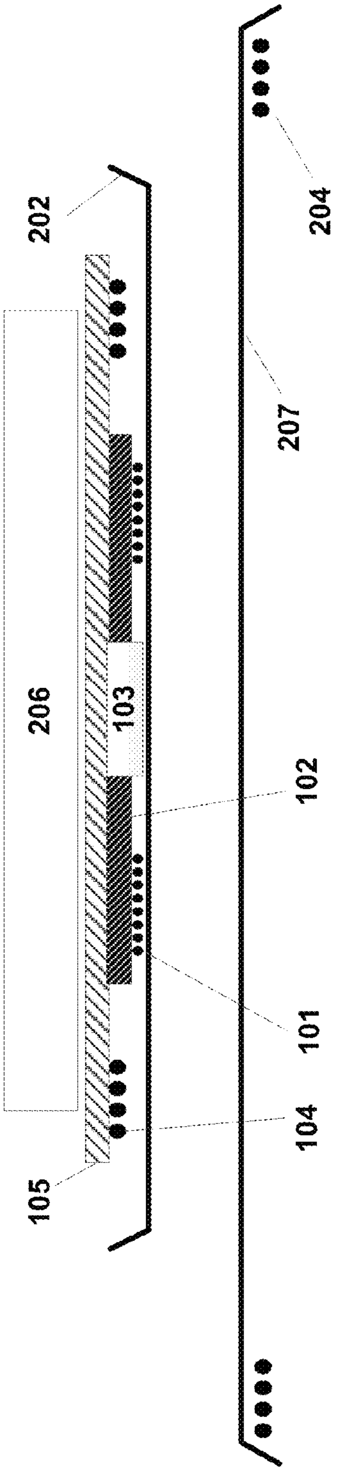

FIGS. 2A and 2B illustrate cross-sectional views of assembly 100 within a portable device 202 in two different configurations for receiving wireless power transfer from a base station device 205 and 207 respectively.

In FIG. 2A, portable device 202 (e.g., apparatus) including assembly 100 is illustrated in a tightly coupled wireless power transfer configuration with a base station device 205. In this configuration, receiving coil 101 is utilized to receive power wirelessly from a corresponding transmitting coil 201. The line identified as 202 may be for example the outer casing of a portable device such as the back cover of the smart phone or tablet. The assembly 100 may be attached to the portable device, or may be attached to a removable cover. The line identified as 205 may be for example the outer casing of a charging base station device on which the portable device 202 is placed.

Tightly coupled inductive wireless power transfer relies on a high coupling coefficient, k, between coil 101 and coil 201, which is the fraction of magnetic flux from coil 201 that passes through coil 101. Because tightly coupled systems benefit from a high coupling coefficient, coil 101 should be in close proximity and aligned with coil 201 to provide efficient power transfer. Thus, to power portable device 202, a user may place device 202 on top of base station device 205 such that receiving coil 101 at least partially overlaps a magnetic field generated with transmitting coil 201. When device 202 is placed overtop base station device 205, base station device 205 may cause alternating electric current to flow through transmitting coil 201. The electric current may cause the transmitting coil 201 to emit an alternating magnetic field. Field lines of the magnetic field may pass through receiving coil 101 when positioned in proximity of transmitting coil 201, thereby inducing alternating electric current to flow through receiving coil 101 by magnetic induction. Device 202 may rectify the alternating electric current induced in receiving coil 101 to produce direct current power to power device 202. The power may be used to charge a battery and/or power other components of device 202 (e.g., processor, memory, display, etc.).

Alignment of receiving coil 101 relative to transmitting coil 201 affects the amount of power induced in receiving coil 101. Efficiency of the magnetic induction may be increased by positioning device 202 to maximize the amount of generated magnetic flux crossing within the loops of receiving coil 101. In various embodiments, a maximum efficiency may be achieved by placing receiving coil 101 such that the loops of coil 101 are concentric with the loops of transmitting coil 201. A user, however, may not be able to determine when receiving coil 101 is concentric with transmitting coil 201, because receiving coil 101 may be internal to device 202 and transmitting coil 201 may be internal to base station device 205. In some instances, a user may place device 202 on base station device 205 such that receiving coil 101 and transmitting coil 201 only partially overlap. To prevent misalignment, device 202 and base station device 205 may include alignment devices such as magnets 103 and 203, which attract to one another to center coil 101 over transmitting coil 201.

FIG. 2B illustrates portable device 202 including assembly 100 in a loosely coupled (i.e., resonant) wireless power transfer configuration with base station device 207. In this configuration receiving coil 104 is utilized to receive power wirelessly from a corresponding transmitting coil 204. The line identified as 207 may for example represent the outer casing of a charging base station device on which the portable device 202 is placed during resonant power transfer. Loosely coupled or resonant wireless power transfer does not rely on a high coupling coefficient, k, between coils 104 and 204. Instead, efficient power transfer is achieved through magnetic induction in which coils 104 and 204 operate at a resonant frequency. As such, receiver coil 104 is operated in a circuit that may include capacitance combined with the inductance of coil 104 such that the LC time constant of the receiver circuit matches the frequency of the electromagnetic field generated by coil 204. Similarly coil 204 is operated in a transmission circuit having capacitance combined with the inductance of coil 204 such that the LC time constant of the transmission circuit radiates the electromagnetic field at the resonant frequency. Because a high coupling coefficient between the coils is not required, the device 202 may be placed anywhere within the boundaries of coil 204 and at a further distance from coil 204 than would be possible in the tightly coupled configuration in FIG. 2A.

Coils 101 and 104 may be tuned to operate at different frequencies. For example, the tightly coupled coil 101 may operate at a lower frequency (e.g., below 1 Mhz) than the resonant coupled coil 104 that operates at a higher frequency (e.g., above 1 Mhz).

Figure 3:
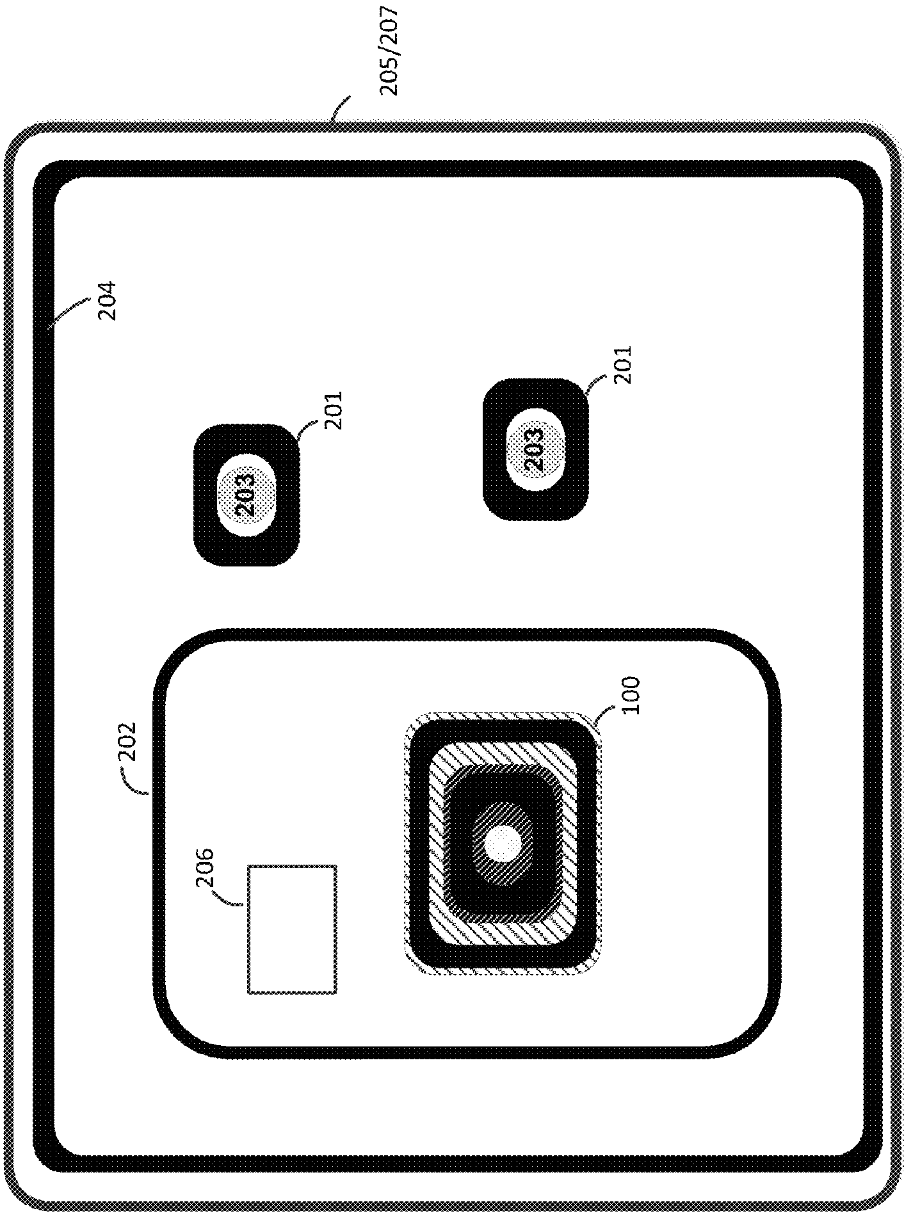
FIG. 3 illustrates an orthogonal view of example arrangements of a receiving coil assembly relative to a transmitting coil assembly operated in multiple different modes according to various embodiments.

FIG. 3 illustrates a top cutaway view illustrating the internal components of the two configurations illustrated in FIGS. 2A and 2B. Base station devices 205/207 may include either coil 204 placed around the perimeter of the base station for implementing resonant inductive power transfer or may include one or more coils 201 for implementing tightly coupled inductive power transfer of power to coil 104. Each coil 201 may implement the same wireless power transfer standard or implement different wireless power transfer standards for transferring power to coil 101. In various embodiments the base station may include both coil 204 and one or more coils 201 simultaneously.

As shown in FIGS. 2A, 2B and 3, device 202 may include components 206, such as a battery, memory, a microprocessor, transceivers, etc. Device 202, for example, may be a mobile phone, a smart phone, a cellular phone, a laptop computer, a mobile device, or other electronic device.

The base station devices 205/207 may be coupled to a power source for charging device 202 through magnetic induction when device 202 is placed on top of base station devices 205/207. Base station devices 205/207 may also be other types of devices or boxes instead of or in addition to a station.

Returning to FIGS. 2A and 2B, shields 102 and 105 may be configured with properties to shield components 206 from transmitted magnetic flux, and/or to improve efficiency of power transfer. To shield the components 206, receiving coil 101 is positioned between shield 102 and transmitting coil 201 when at least a portion of the receiving coil 101 and transmitting coil 201 are overlapping as indicated in FIG. 2B. Shield 102, which may be made of a ferrite material, may protect components 206, which may include a battery, chassis, printed circuit board, as well as other electronic components, and device structure from undesired leakage of power generated by coil 201 during power transfer. Shield 102 may be configured (e.g., formed into a shape and/or positioned) to reduce exposure of at least one internal component of device 202 to a magnetic field generated by coil 201. In various embodiments, shield 102 reduces exposure of an internal component of device 202 by being placed behind receiving coil 101 (e.g., placed on the side of receiving coil 101 opposite the transmitting coil 201 and between receiving coil 101 and the components 206 to be protected).

Shield 105 works in much the same way as shield 102 to prevent magnetic flux transmitted from coil 204 from reaching components 206. The field generated from coil 204, however, when operated in the resonant mode is not localized to the area directly under coil 104 and components 206. As such, various embodiments extend shield 105 in the lateral directions beyond the edges of components 206 to cover the areas of components 206 exposed to a magnetic field from coil 104.

Shields 102 and 105 may shield components 206 (e.g., electronics) primarily by providing a low reluctance magnetic flux path away from the shielded components. Because the ferrite shield has a higher permeability than the air and device packaging (e.g., plastics, semiconductor, non-ferrous metals, etc.) behind the shield, the magnetic flux emanating from the transmitting coils 201 and 204 will follow the shape of the shields 102 and 105 rather than passing through the shield to the components 206 being protected.

Undesired power leakage from transmitting coils 201 and 204 to components 206 depends upon the amount of magnetic field that is to be channeled away from the protected components by shields 102 and 105 and by the capacity of shields 102 and 105 to support the magnetic field. Once the magnetic field exceeds the shield's capacity to support the magnetic field, the shield saturates (i.e., exceeds the magnetic flux density saturation point), resulting in the excess magnetic field that exceeds the shield's capacity to pass through the shield reaching components 206.

Factors that affect the amount of magnetic field reaching shields 102 and 105 may include the power draw from receiving coils 101 and 104 to power device 202, the non-concentric alignment of the receiving coil 101 over transmitting coil 201, and the presence of the optional alignment magnets 103 and 203. Factors that affect the capacity of shields 102 and 105 to support a magnetic field include the permeability of the materials and the structure of the shield.

Various embodiments includes shields 102 and 105 having different materials and structures selected based on the differences in geometries, operating frequencies, and field strengths between the tightly coupled and loosely coupled wireless power transfer configurations. As noted above, the ability of the shields 102 and 105 to protect components 206 is affected by both the amount of magnetic flux (from transmitting coils 201 and 204) to be shielded, and by the capacity of shields 102 and 105 to support a magnetic field. For the tightly coupled configuration of coils 101 and 201, the high coupling factor and/or low frequency greatly increase the magnetic flux that reaches shield 102. The presence of alignment magnets 103 and 203 further increase the static magnetic flux at shield 102. The high magnetic flux could result in the saturation of the shield, which would change the coil inductance and resonant frequency causing the malfunction of the system. To keep shield 102 from saturating because of the high magnetic flux, various embodiments include a material for shield 102 with a low permeability (e.g., below 50μ). The low permeability material in shield 102 provides the further benefit of concentrating the flux density around coil 101, thus improving efficiency of energy transfer.

In contrast to the tightly coupled configuration, the loosely or resonant coupled configuration of coils 104 and 204 do not include a high magnetic flux density that would saturate the shield, and thus benefit from a low permeability material. Further, the higher frequency of the resonant coupling requires a higher permeability to provide sufficient shielding. Accordingly, various embodiments include shield 105 comprised of a high permeability (e.g., above 100μ) material.

Figure 4:
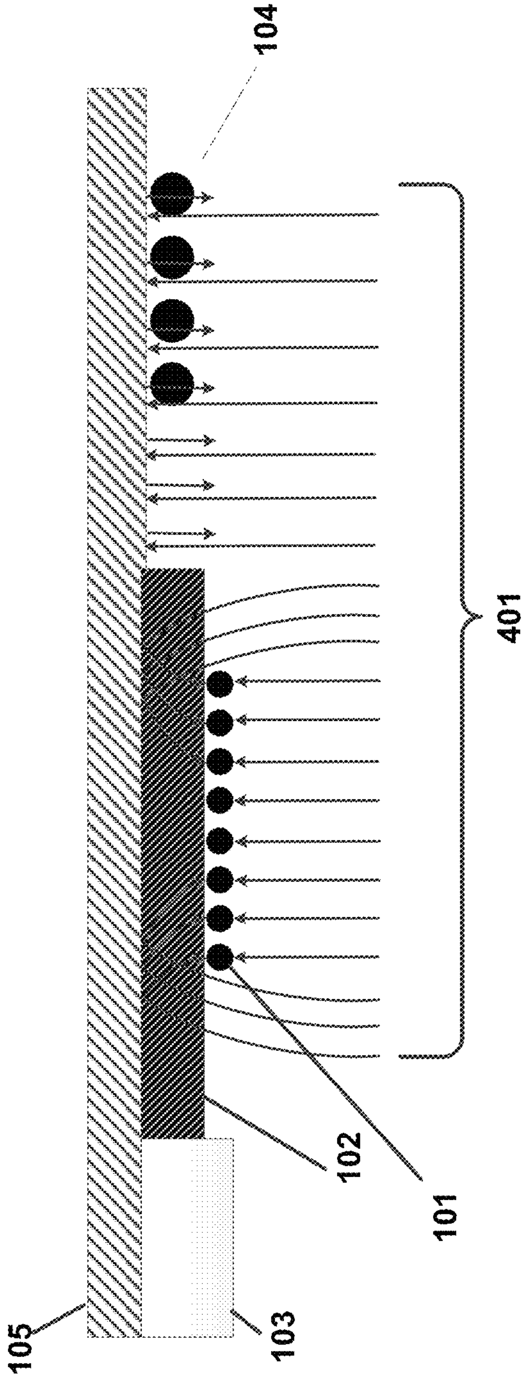
FIG. 4 illustrates a cross sectional view of an example receiving coil assembly operated in one of multiple modes according to various embodiments.

Various embodiments may select the material and geometry (e.g., length, width, thickness) of shield 102 based on the operating parameters of one or more modes of operation using coil 101 for energy transfer and select the material and geometry (e.g., length, width, thickness) of shield 105 based on the operating parameters of one or more additional modes of operation using coil 104 for energy transfer. Various embodiments may additionally select the material and geometry and relative positioning of shields 102 and 105 based on the combined properties of the shields in any one of the operating modes. FIG. 4, for example, illustrates a portion (the right half) of assembly 100 in the presence of low frequency (e.g., below 1 Mhz) magnetic flux transmitted to coil 101 from coil 201 in one of the tightly coupled modes. This embodiment includes shield 105 layered on top of shield 102 (e.g., away from the transmitting coil 201 (not shown). As shown by the magnetic flux 401 around coil 101, the density of magnetic flux 401 reaching shield 102 is increased and directed towards coil 101, preventing the flux from continuing through to components 206. Further, shield 105 may be positioned above shield 102 to provide extra shielding. Because shield 102 has absorbed some of the magnetic flux and because shield 105 is further away from the source of the magnetic flux, the high permeability of shield 105 provides effective shielding without being saturated. Similarly, flux from coil 201 that reaches shield 105 in the areas of coil 104 may also be effectively blocked because of the greater distance from the transmitting coil 201. In embodiments utilizing both shields for a single mode of operation, the shield materials may be selected based on the operating frequencies of multiple operating modes of either coil or both coils.

Embodiments may include shield 105 comprised of, for example, $Fe_{73}Cu_1Nb_3Si_{16}B_7$, which has a relative permeability of approximately 10,000 at a frequency in the range of 100-200 KHz. Other embodiments may include shields 102 and 105 comprising Fe alone or combined with one or more elements selected from a group consisting of Si, Al, Zn, Ni, Co, Cu, Nb, B, Mn, Mo, and Cu. For example, the lower permeability layer material may be selected so that it shields the components from, and does not saturate in the presence of the magnetic field from coil 201 at a first frequency (e.g., 100 KHz) and in the presence of the static magnetic field of permanent magnets 103 and 203. The higher permeability layer may be selected such that it shields the components from the magnetic field from coil 204 at a second frequency (e.g., 6.8 MHz) and also does not saturate in the presence of the first magnetic field from 201 because it is located at a distance behind or adjacent to the lower permeability layer. A suitable combination of layers composed of high and low magnetic permeability materials may, in various embodiments, provide sufficient protection in multiple modes and standards of operation.

Figure 5A:
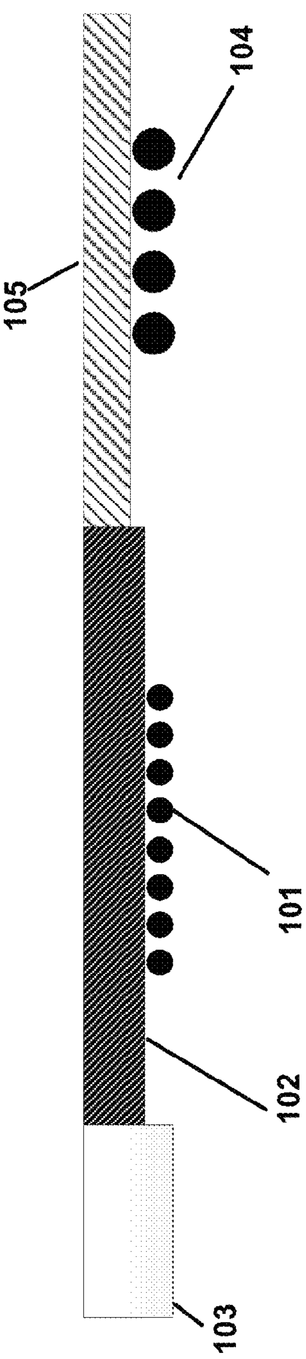
FIGS. 5A-5B illustrate cross sectional views of various receiving coil assemblies according to various embodiments.
Figure 5B:
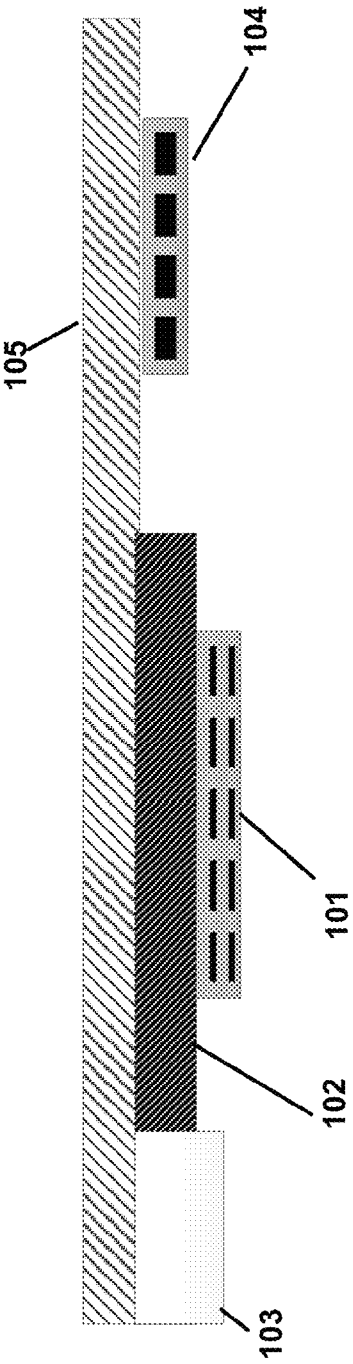

FIGS. 5A and 5B illustrate various other embodiments of assembly 100. In the embodiment shown in FIG. 5A, shield 105 is placed in the same plane and surrounding the perimeter of shield 102. This embodiment may have the advantage of being thinner than the embodiment shown in FIG. 1. Such an embodiment may be effective, for example, when the field strength of the resonant coupled mode is weak enough such that shield 102 provides effective shielding in the middle of the device when exposed to the magnetic field generated by coil 204, even though it has low permeability. As in FIG. 4, shield 105 may also provide effective shielding when operating in the tightly coupled mode, because the field generated by coil 201 is sufficiently reduced at the further distance in the area covering coil 104.

FIG. 5B illustrates a similar configuration to that shown in FIG. 1 except that coil 101 is formed using copper traces of a printed circuit board and coil 104 is formed from copper traces of a flex cable. In any of the embodiments, coils 101, 104, 201, and 204 can be formed from copper wire or other conductive material, circuit board traces, flex cable, or other suitable structure for carrying current.

In some examples, the thickness of the layers may be based on the relationship between a magnetic field and distance. For instance, as shown with respect to FIG. 5A, the thickness of shield 105 may be selected to provide a specific level of shielding based on the worst case condition between operating in the presence of a magnetic field from coil 204 when in a resonant mode of operation or operating in the presence of a magnetic field from coil 201 when in a tightly coupled mode of operation.

Figure 6:
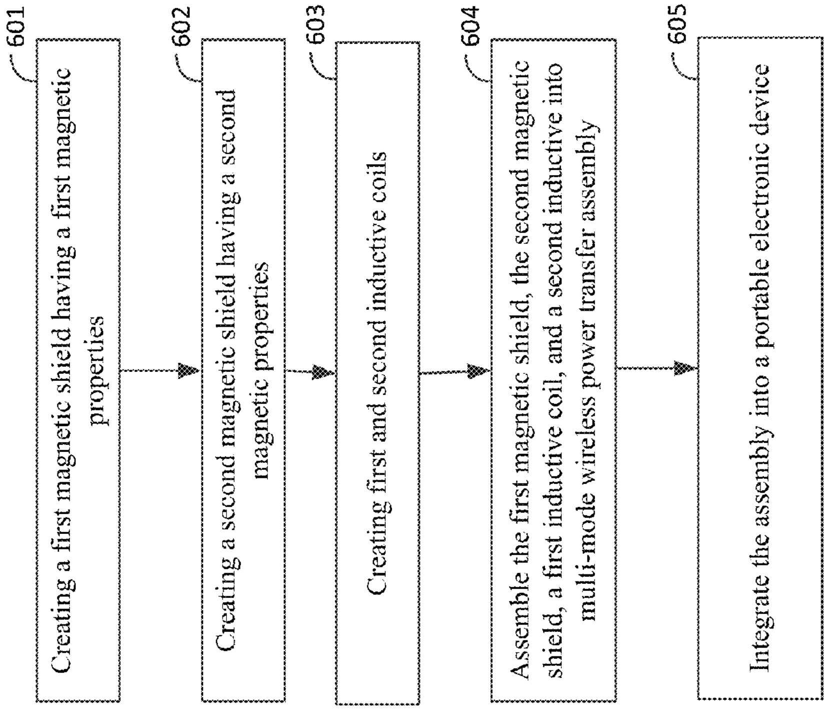
FIG. 6 is a flow chart of an example method in accordance with various embodiments.

FIG. 6 is a diagram of a method for manufacturing a multi-mode wireless power transfer assembly in accordance with example embodiments. In some variations, one or more steps indicated in FIG. 6 may be omitted, rearranged or replaced with different steps. Other steps might also be added. The steps indicated in FIG. 6 may be performed manually or by manufacturing equipment under control of a processor or other computing device. For convenience, performance of operations by such hardware will be generally described as performance of operations by manufacturing equipment. Such operations may be performed as the result of executing machine-executable instructions stored within one or more memories of manufacturing equipment and/or executing instructions that are stored as hard-coded dedicated logic.

In step 601, manufacturing equipment may create a first magnetic shield having first magnetic properties (e.g., permeability, saturation magnetic flux density, Curie point, resistivity, etc.) and a first thickness. In step 602, manufacturing equipment may create a second layer having second magnetic properties and a second thickness. The second thickness may be different than the first thickness. The first magnetic permeability may be, for example, below 50μ, and the second magnetic permeability may be, for example, above 100μ.

In steps 603, manufacturing equipment may create a first inductive coil and a second inductive coil. The first inductive coil may be tuned to operate in one or more different modes of tightly coupled inductive wireless power transfer, and the second inductive coil may be tuned to operate in one or more different modes of loosely (i.e., resonant) coupled inductive wireless power transfer.

In step 604, the first magnetic shield, the second magnetic shield, the first inductive coil, and the second inductive coil may be provided or received from manufacturing and assembled into a multi-mode wireless power transfer assembly operable to receive power in the one or more different modes of tightly coupled inductive wireless power transfer and the one or more different modes of loosely (i.e., resonant) coupled inductive wireless power transfer. In some embodiments, step 604 includes positioning the first magnetic shield in-between the second magnetic shield and the first inductive coil. In other embodiments, step 604 includes positioning the first magnetic shield and the second magnetic shield within a common plane such that the perimeter of the first magnetic shield is encompassed by the second magnetic shield (e.g., as in FIG. 5A).

In step 605, the assembly is integrated into a portable electronic device. Step 605 may include integrating, with the assembly, a power conversion circuit that is configured to power one or more internal electronic components of the portable electronic device with electric currents induced in the first and second inductive coils. The portable electronic device may include a cellular phone, a smartphone, or a tablet computer. In an alternative embodiment, instead of integrating the assembly into the portable electronic device, the assembly is integrated into just a removable cover of a portable electronic device. The removable cover with the assembly may then attached and detached from the portable electronic device.

In various embodiments, the multiple components of the multi-mode wireless power transfer assembly are integrated into the structure of the portable electronic device or within the removable cover. For example, shields and coils may be mechanically attached (e.g., soldered, screwed, bonded with epoxy, etc.) to a circuit board over the electronic components of the circuit board. In other variations, the shields and coils may be encapsulated in the body of the device or cover (e.g., molded in a thermoplastic casing). In further variations, one or more of the shields and coils are integrated into a sub-component (e.g., battery) of the device. Various embodiments may use a combination of such attachment techniques for the different shields and coils.

Figure 7:
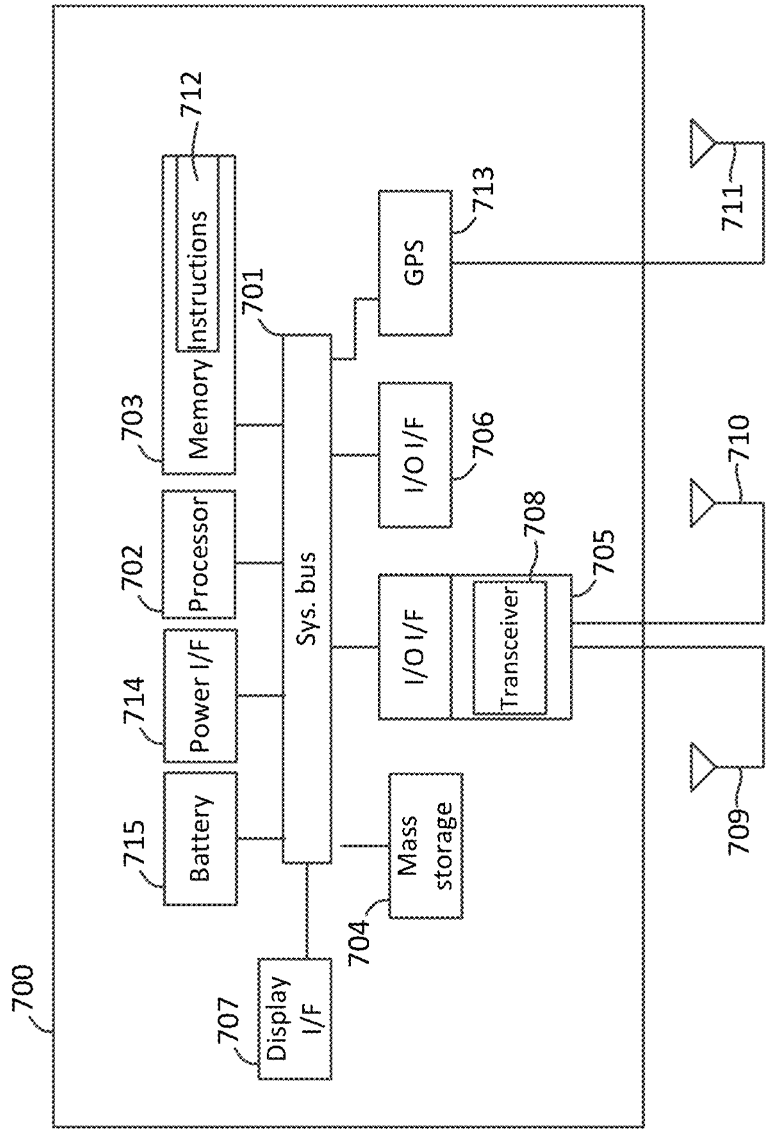
FIG. 7 shows an illustrative device in accordance with various embodiments.

Various types of computers can be used to implement a device such as devices 205, 207, and 202 according to various embodiments or to implement processes described herein, such as those described with respect to FIG. 6. FIG. 7 shows an illustrative device 700 in accordance with example embodiments. Device 700 includes a system bus 701 which may operatively connect various combinations of one or more processors 702, one or more memories 703 (e.g., random access memory, read-only memory, etc.), mass storage device(s) 704, input-output (I/O) interfaces 705 and 706, display interface 707, and global positioning system (GPS) chip 713, power interface 714, and battery 715. Power interface 714 may include, for example, wired and wireless power transfer circuitry, including assembly 100 if configured to receive wireless power and/or coils 201 and 204 if configured to transmit wireless power.

Interface 705 may include one or more transceivers 708, antennas 709 and 710, and other components for communication in the radio spectrum. Interface 706 and/or other interfaces (not shown) may similarly include a transceiver, one or more antennas, and other components for communication in the radio spectrum, and/or hardware and other components for communication over wired or other types of communication media. Interfaces 705 and 706 may for example perform communications between device 202 and base station devices 205 and 207 for selecting charging modes and for controlling wireless power transfer. GPS chip 713 may include a receiver, an antenna 711 and hardware and/or software configured to calculate a position based on GPS satellite signals.

Memory 703 and mass storage device(s) 704 may store in a non-transient manner (permanently, cached, etc.), machine executable instructions 712 (e.g., software) executable by the processor(s) 702 for controlling operation of devices 205, 207, and 202 as described herein or for performing other processes described herein, such as those illustrated in FIG. 6.

Mass storage 704 may include a hard drive, flash memory or other type of non-volatile storage device. Processor(s) 702 may be, e.g., an ARM-based processor such as a Qualcomm Snapdragon or an x86-based processor such as an Intel Atom or Intel Core. Device 700 may also include a touch screen (not shown) and physical keyboard (also not shown). A mouse or keystation may alternately or additionally be employed. A physical keyboard might optionally be eliminated.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments.

The invention claimed is:

1. An apparatus comprising:

a first inductive coil tuned to operate in one or more first modes of inductive wireless power transfer;

a second inductive coil positioned concentrically with the first inductive coil and tuned to operate in one or more second modes of inductive wireless power transfer;

a first magnetic shield comprising a first material having a first magnetic permeability configured to shield an apparatus component when operating in the one or more first modes of inductive wireless power transfer; and a second magnetic shield comprising a second material having a second magnetic permeability configured to shield the apparatus component when operating in the one or more second modes of inductive wireless power transfer, wherein the first magnetic shield and the second magnetic shield are positioned within a common plane and the second magnetic shield surrounds a perimeter, in the common plane, of the first magnetic shield.

2. The apparatus of claim 1, wherein a first thickness of the first magnetic shield differs from a second thickness of the second magnetic shield.

3. The apparatus of claim 1, wherein the first magnetic permeability is below 50μ and the second magnetic permeability is above 100μ.

4. The apparatus of claim 1, wherein the one or more first modes of inductive wireless power transfer include a tightly coupled mode of inductive wireless power transfer, and the one or more second modes of inductive wireless power transfer include a resonant mode of inductive wireless power transfer.

5. The apparatus of claim 4, wherein the one or more first modes of inductive wireless power transfer include a second tightly coupled mode of inductive wireless power transfer.

6. The apparatus of claim 1, further comprising a portable electronic device configured to receive power wirelessly via the first inductive coil and the second inductive coil.

7. The apparatus of claim 6, wherein the portable electronic device includes a cellular phone, a smartphone, or a tablet computer.

8. The apparatus of claim 1, further comprising a removable cover of a portable electronic device, wherein the first inductive coil, the second inductive coil, the first magnetic shield, and the second magnetic shield are attached to the removable cover.

9. A method comprising:

providing a first magnetic shield having a first magnetic permeability;

providing a second magnetic shield having a second magnetic permeability;

positioning the first magnetic shield and the second magnetic shield within a common plane such that a perimeter, in the common plane, of the first magnetic shield is surrounded by the second magnetic shield; and assembling, into a multi-mode wireless power transfer device, the first magnetic shield, the second magnetic shield, a first inductive coil tuned to operate in one or more first modes of inductive wireless power transfer, and a second inductive coil tuned to operate in one or more second modes of inductive wireless power transfer.

10. The method of claim 9, further comprising positioning the first magnetic shield in-between the second magnetic shield and the first inductive coil.

11. The method of claim 9, further comprising creating the first magnetic shield and the second magnetic shield with different thicknesses.

12. The method of claim 9, wherein the first magnetic permeability is below 50μ and the second magnetic permeability is above 100μ.

13. The method of claim 9, wherein the one or more first modes of inductive wireless power transfer include a tightly coupled mode of inductive wireless power transfer, and the one or more second modes of inductive wireless power transfer include a resonant mode of inductive wireless power transfer.

14. The method of claim 9, further comprising integrating the multi-mode wireless power transfer device into a portable electronic device.

15. An electronic device comprising:

one or more internal electronic components;

a first inductive coil and a second inductive coil tuned to operate respectively in a first mode of inductive wireless power transfer and a second mode of inductive wireless power transfer;

a power conversion circuit configured to power the one or more internal electronic components with electric currents induced in the first and second inductive coils; and a first magnetic shield and a second magnetic shield respectively comprising a first permeability and a second permeability, the first magnetic shield and the second magnetic shield configured to shield the one or more internal electronic components from magnetic fields that induce the electric currents in the first inductive coil and the second inductive coil, and the first magnetic shield and the second magnetic shield positioned within a common plane such that a perimeter, in the common plane, of the first magnetic shield is surrounded by the second magnetic shield.

16. The electronic device of claim 15, wherein the first mode of inductive wireless power transfer includes a tightly coupled mode of inductive wireless power transfer, and the second mode of inductive wireless power transfer includes a resonant mode of inductive wireless power transfer.

17. The method of claim 10, further comprising positioning the second inductive coil below the second magnetic shield such that the second inductive coil is positioned at an off-set relative to a position of the first inductive coil.

18. The apparatus of claim 1, further comprising a battery, wherein the first inductive coil and the second inductive coil are configured to charge the battery with the one or more first modes of inductive wireless power transfer and the one or more second modes of inductive wireless power transfer, respectively.

19. The method of claim 9, further comprising:

assembling, into the multi-mode wireless power transfer device, a battery such that the first inductive coil and the second inductive coil are arranged to charge the battery with the one or more first modes of inductive wireless power transfer and the one or more second modes of inductive wireless power transfer, respectively.

20. The electronic device of claim 15, further comprising a battery, wherein the first inductive coil and the second inductive coil are configured to charge the battery with the first mode of inductive wireless power transfer and the second mode of inductive wireless power transfer, respectively.

* * * * *